(12) United States Patent
Tsai et al.

(10) Patent No.: US 8,004,785 B1
(45) Date of Patent: Aug. 23, 2011

(54) DISK DRIVE WRITE VERIFYING UNFORMATTED DATA SECTORS

(75) Inventors: Chun Sei Tsai, Tustin, CA (US); William B. Boyle, Lake Forest, CA (US); Carl E. Barlow, Lake Forest, CA (US); Kenneth J. Smith, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 322 days.

(21) Appl. No.: 12/118,365

(22) Filed: May 9, 2008

(51) Int. Cl.
*G11B 5/09* (2006.01)
(52) U.S. Cl. .......................................................... 360/53
(58) Field of Classification Search .................... 360/53, 360/31, 48, 77.04; 711/162, 170; 710/16; 714/8, 42, 769, 805; 369/53.17, 59.23, 59.12
See application file for complete search history.

(56) References Cited

U.S. PATENT DOCUMENTS

| | | | |
|---|---|---|---|
| 4,939,598 A | 7/1990 | Kulakowski et al. | |
| 5,696,775 A * | 12/1997 | Nemazie et al. | 714/805 |
| 5,937,435 A | 8/1999 | Dobbek et al. | |
| 5,966,726 A | 10/1999 | Sokolov | |
| 6,002,544 A | 12/1999 | Yatsu | |
| 6,018,789 A | 1/2000 | Sokolov et al. | |
| 6,098,185 A | 8/2000 | Wilson | |
| 6,101,065 A | 8/2000 | Alfred et al. | |
| 6,134,214 A | 10/2000 | Takagi et al. | |
| 6,289,484 B1 | 9/2001 | Rothberg et al. | |
| 6,327,106 B1 | 12/2001 | Rothberg | |
| 6,408,357 B1 | 6/2002 | Hanmann et al. | |
| 6,412,089 B1 | 6/2002 | Lenny et al. | |
| 6,429,984 B1 | 8/2002 | Alex | |
| 6,442,715 B1 | 8/2002 | Wilson | |
| 6,532,517 B1 | 3/2003 | Wagner et al. | |
| 6,535,995 B1 * | 3/2003 | Dobbek | 714/8 |
| 6,545,835 B1 | 4/2003 | Codilian et al. | |
| 6,606,211 B1 | 8/2003 | Lim et al. | |
| 6,611,393 B1 | 8/2003 | Nguyen et al. | |
| 6,628,466 B2 | 9/2003 | Alex | |
| 6,650,492 B2 | 11/2003 | Lenny et al. | |
| 6,654,193 B1 | 11/2003 | Thelin | |
| 6,690,523 B1 | 2/2004 | Nguyen et al. | |
| 6,707,635 B1 | 3/2004 | Codilian et al. | |
| 6,710,953 B1 | 3/2004 | Vallis et al. | |
| 6,745,283 B1 | 6/2004 | Dang | |
| 6,795,894 B1 | 9/2004 | Neufeld et al. | |
| 6,809,893 B2 | 10/2004 | Uzumaki et al. | |

(Continued)

OTHER PUBLICATIONS

Office Action dated Jun. 10, 2010 from U.S. Appl. No. 11/950,324, 37 pages.

(Continued)

*Primary Examiner* — Fred Tzeng

(57) ABSTRACT

A disk drive is disclosed comprising a disk having a plurality of data sectors, wherein a physical block address (PBA) is associated with each data sector. When a write command is received from a host to write user data to the disk, and the write command comprises an unformatted logical block address (LBA), the user data is written to a first data sector, and the first data sector is write verified. A second data sector is defect scanned, and after the second data sector passes the defect scan, the user data is migrated from the first data sector to the second data sector and the LBA is formatted to the second data sector.

14 Claims, 6 Drawing Sheets

U.S. PATENT DOCUMENTS

| | | | |
|---|---|---|---|
| 6,842,801 B2 | 1/2005 | Yamada | |
| 6,928,525 B1 | 8/2005 | Ebner et al. | |
| 6,947,234 B2 | 9/2005 | Lamberts et al. | |
| 6,950,967 B1 * | 9/2005 | Brunnett et al. | 714/42 |
| 6,973,553 B1 * | 12/2005 | Archibald et al. | 711/162 |
| 6,995,933 B1 | 2/2006 | Codilian et al. | |
| 7,099,993 B2 | 8/2006 | Keeler | |
| 7,106,547 B1 | 9/2006 | Hargarten et al. | |
| 7,143,203 B1 | 11/2006 | Altmejd | |
| 7,173,782 B2 | 2/2007 | Ikeda et al. | |
| 7,274,639 B1 | 9/2007 | Codilian et al. | |
| 7,345,837 B1 | 3/2008 | Schreck et al. | |
| 7,461,202 B2 | 12/2008 | Forrer, Jr. et al. | |
| 7,477,465 B2 | 1/2009 | Yu | |
| 7,626,908 B2 * | 12/2009 | Nakagawa et al. | 369/59.23 |
| 2003/0174549 A1 * | 9/2003 | Yaguchi et al. | 365/200 |
| 2006/0066971 A1 | 3/2006 | Alex et al. | |
| 2006/0203661 A1 * | 9/2006 | Chen et al. | 369/53.2 |
| 2008/0082778 A1 * | 4/2008 | Inoue et al. | 711/170 |
| 2008/0130153 A1 * | 6/2008 | Lee et al. | 360/48 |

OTHER PUBLICATIONS

Charles M. Kozierok, ("Logical Block Addressing (LBA)"), Apr. 17, 2001, pp. 1-2, http://www.pcguide.com/ref/hdd/bios/modesLBA-c.html.
Charles M. Kozierok, ("Seek Time"), Apr. 17, 2001, pp. 1-3, http://www.pcguide.com/ref/hdd/perf/perf/spec/posSeek-c.html.
U.S. Appl. No. 11/950,287, filed Dec. 4, 2007.
U.S. Appl. No. 11/950,324, filed Dec. 4, 2007.
Office Action dated Oct. 28, 2010 from U.S. Appl. No. 11/950,287, 18 pages.
Office Action dated Nov. 15, 2010 from U.S. Appl. No. 11/950,324, 33 pages.
Walter A. Burkhard et al., Rotational Position Optimization (RPO) Disk Scheduling, First Conference on File and Storage Technologies (FAST '02), Jul. 16, 2001, pp. 1-11.
Office Action dated Feb. 23, 2011 from U.S. Appl. No. 111950,324, 33 pages.
Office Action dated Mar. 9, 2011 from U.S. Appl. No. 11/950,287, 21 pages.

* cited by examiner

US 8,004,785 B1

DISK DRIVE WRITE VERIFYING UNFORMATTED DATA SECTORS

BACKGROUND

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

Each data sector is typically assigned a physical block address (PBA) which is accessed indirectly through a logical block address (LBA) to facilitate mapping out defective data sectors. A PBA associated with defective data sectors may simply remain unmapped if found during manufacturing, or if a data sector becomes defective while in-the-field (grown defect), the LBA may be remapped to the PBA of a spare data sector (and the data relocated to the spare data sector). The process of initially mapping the LBAs to PBAs and mapping out defective PBAs is referred to as "formatting" the disk. The disk is formatted when the disk drive is manufactured rather than when the disk drive is in-the-field. The prior art has suggested to perform in-the-field defect scanning to relocate defective data sectors to spare data sectors by remapping the LBA of the defective data sector to the PBA of the spare data sector. However, mapping out grown defects in-the-field is still performed after the entire disk has been formatted (after the initial defect scanning and mapping of the LBAs to PBAs during manufacturing).

Scanning for defective sectors during manufacturing of the disk drive typically involves writing a special test pattern to each data sector (e.g., a 2T pattern) and reading the test pattern to identify defects. For example, a drop in the amplitude of the read signal may indicate a defect, or a defect filter matched to a defect signature may indicate a defect, or a number of bit errors exceeding a threshold may indicate a defect, etc. However, defect scanning every data sector in a disk drive represents a significant bottleneck in the manufacturing process thereby increasing the manufacturing cost.

SUMMARY OF EMBODIMENT OF THE INVENTION

A disk drive is disclosed comprising a disk having a plurality of data sectors, wherein a physical block address (PBA) is associated with each data sector. When a write command is received from a host to write user data to the disk, and the write command comprises an unformatted logical block address (LBA), the user data is written to a first data sector, and the first data sector is write verified. A second data sector is defect scanned, and after the second data sector passes the defect scan, the user data is migrated from the first data sector to the second data sector and the LBA is formatted to the second data sector.

DETAILED DESCRIPTION OF EMBODIMENTS OF THE INVENTION

Figure 1A:
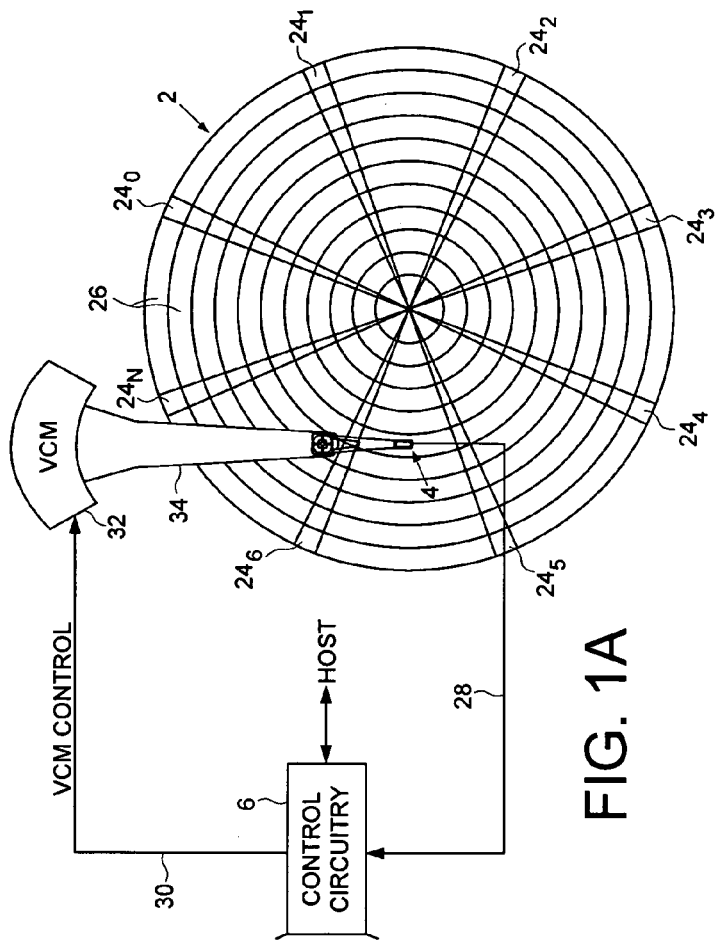
FIG. 1A shows a disk drive according to an embodiment of the present invention comprising a disk, a head actuated over the disk, and control circuitry.

FIG. 1A shows a disk drive comprising a disk 2 having a plurality of data sectors, wherein a physical block address (PBA) is associated with each data sector. A head 4 is actuated over the disk 2, and control circuitry 6 executes the flow diagram of FIG. 1B to process write commands received from a host. When a write command is received from the host to write user data to the disk (step 8), and the write command comprises an unformatted logical block address (LBA) (step 10), the user data is written to a first data sector (step 12), the first data sector is write verified (step 14), a second data sector is defect scanned (step 16), after the second data sector passes the defect scan (step 18), the user data is migrated from the first data sector to the second data sector (step 20), and the LBA is formatted to the second data sector (step 22).

In the embodiment of FIG. 1A, the disk 2 comprises a plurality of embedded servo sectors $24_0$-$24_N$ that define data tracks 26 comprising the data sectors. The control circuitry 6 processes a read signal 28 emanating from the head 4 to demodulate the embedded servo sectors $24_0$-$24_N$ and generate a position error signal (PES) representing a radial offset of the head 4 from a target track 26. The control circuitry 6 processes the PES with a suitable servo compensator to generate a control signal 30 applied to a voice coil motor (VCM) 32. The VCM 32 rotates an actuator arm 34 about a pivot in order to actuate the head 4 radially over the disk 2 in a direction that decreases the PES.

Figure 2:
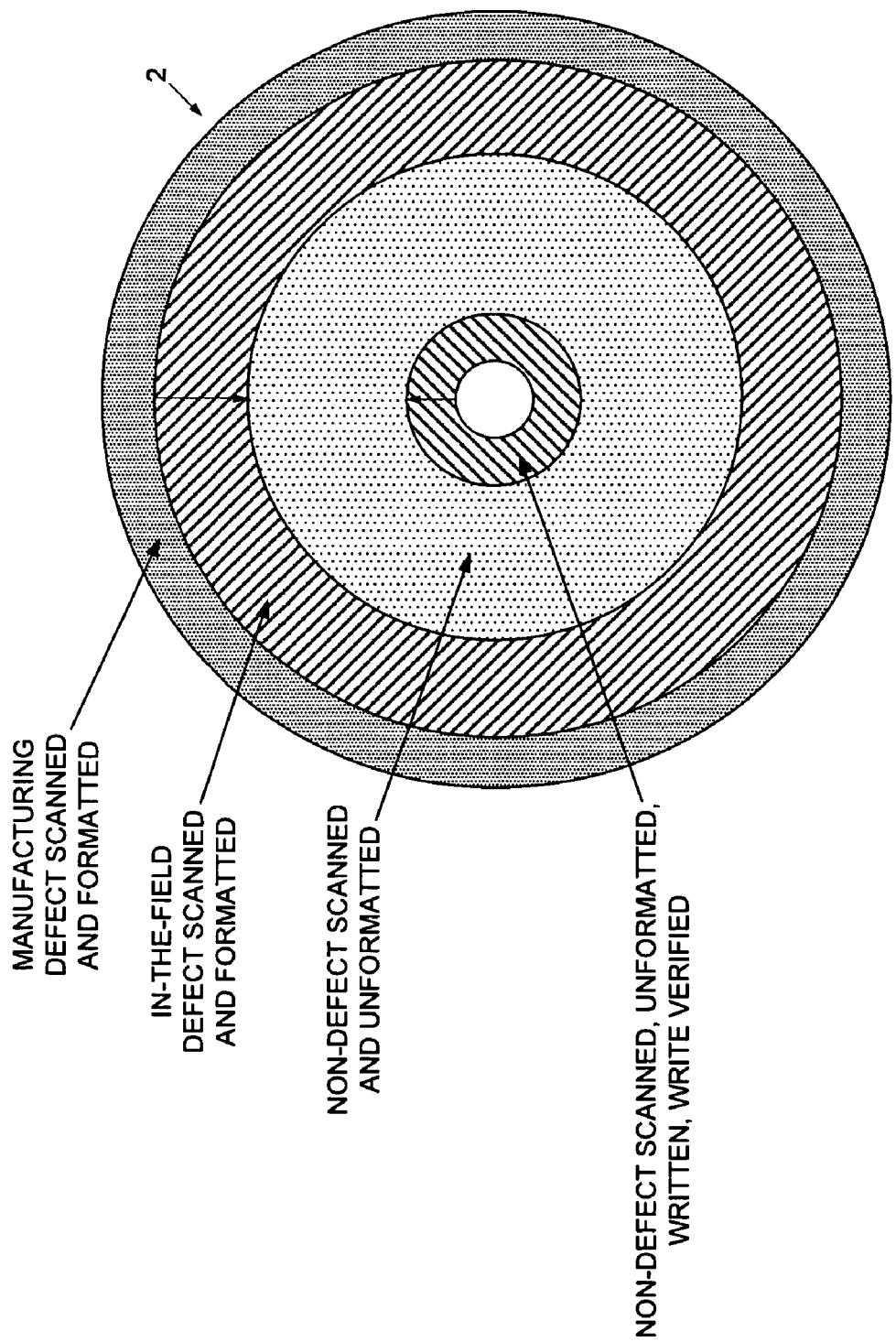
FIG. 2 illustrates an embodiment of the present invention wherein a first area of the disk is defect scanned and formatted during manufacturing, and the remainder of the disk is defect scanned and formatted while the disk drive is deployed in the field.

FIG. 2 shows a disk format according to an embodiment of the present invention wherein a number of data sectors in a first area of the disk 2 are defect scanned and formatted during manufacturing of the disk drive prior to shipping. The first area of the disk may be used, for example, by a personal computer (PC) manufacturer to load an operating system onto the disk drive. The remainder of the disk is defect scanned and formatted while the disk drive is deployed in the field. In the embodiment of FIG. 2, the data sectors are defect scanned from a first diameter of the disk (e.g., outer diameter) toward a second diameter of the disk (e.g., inner diameter). The user data of unformatted LBAs is written to data sectors starting at the second diameter of the disk (e.g., inner diameter) toward the first diameter (e.g., outer diameter) as shown in FIG. 2. In this manner, the defect scanned and formatted data sectors "grow" toward the unformatted data sectors. In one embodiment, the unformatted area of the disk for temporarily storing the user data is maintained as a circular first-in first-out (FIFO) buffer. When the boundary of the unformatted data sectors approaches the boundary of the formatted data sectors (within a predetermined threshold), the head pointer of the circular buffer "wraps" around to the beginning of the buffer near the second diameter (e.g., inner diameter).

The formatted and unformatted data sectors may be located at any suitable area of the disk. In one embodiment, the disk comprises multiple circular buffers disbursed at a suitable radial spacing for storing the user data for unformatted LBAs. This embodiment may help expedite the migration process by reducing the seek length between the formatted and unformatted areas of the disk.

Figure 1B:
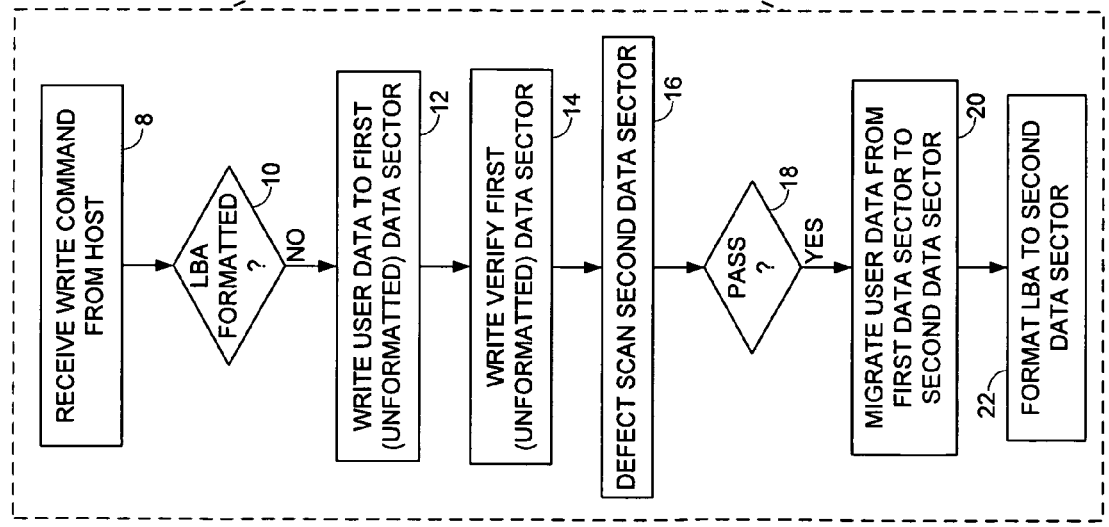
FIG. 1B is a flow diagram executed by the control circuitry according to an embodiment of the present invention wherein user data is written to an unformatted area of the disk, write verified, and eventually migrated to a formatted area of the disk.
Figure 3:
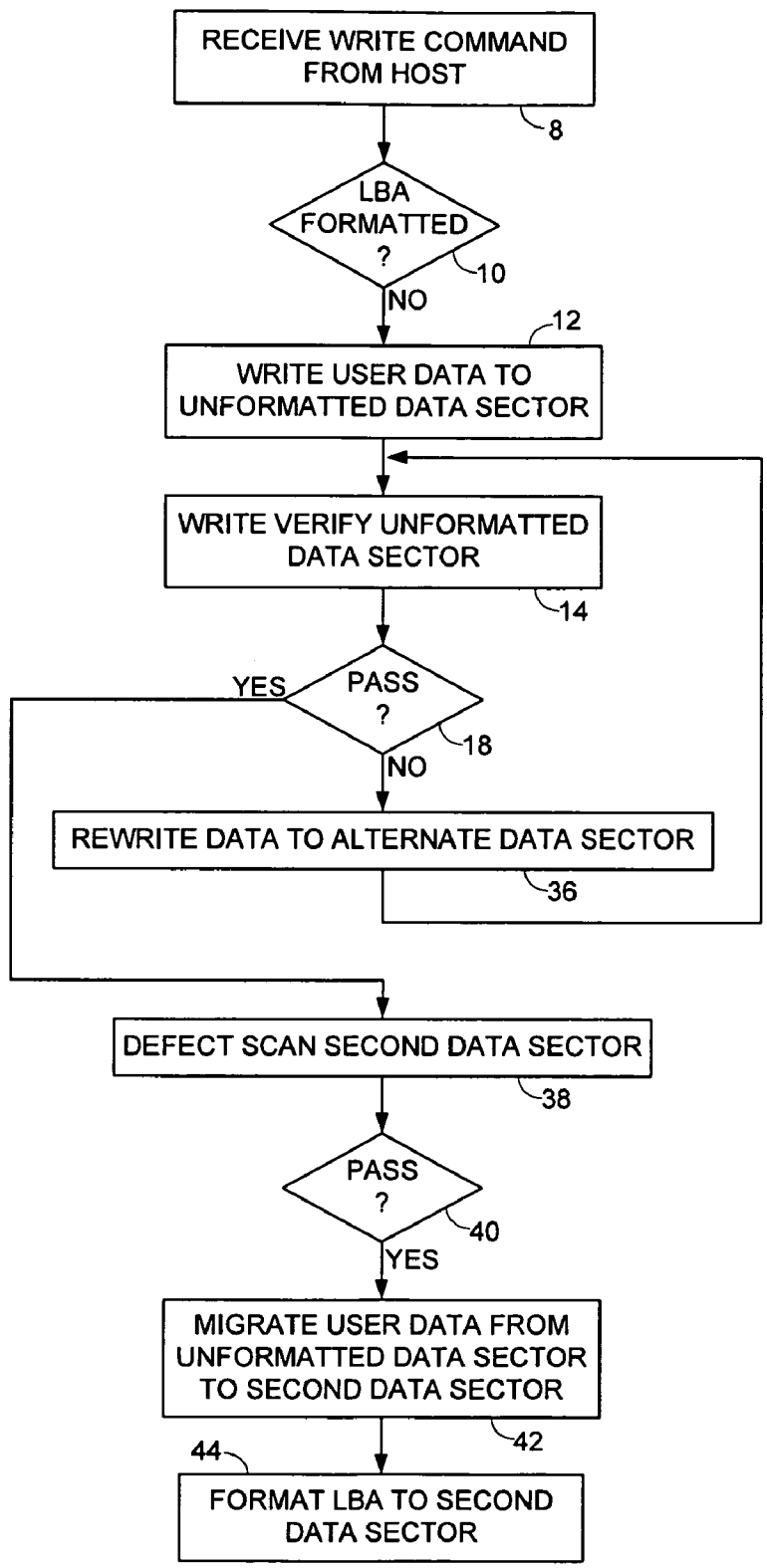
FIG. 3 shows a flow diagram according to an embodiment of the present invention wherein the user data is written to an alternative data sector if a first unformatted data sector fails the write verify.

FIG. 3 shows a flow diagram according to an embodiment of the present invention which is an extension of the flow diagram of FIG. 1B, wherein if the first (unformatted) data sector fails the write verify (step 18), then the user data is written to an alternate data sector (step 36) and the write verify is re-executed (step 14). This process continues until an alternate data sector passes the write verify. The second data sector is then defect scanned (step 38), and when the second data sector passes the defect scan (step 40), the user data stored in the alternate data sector is migrated to the second data sector (step 42), and the corresponding LBA for the user data is formatted to the second data sector (step 44).

Figure 4:
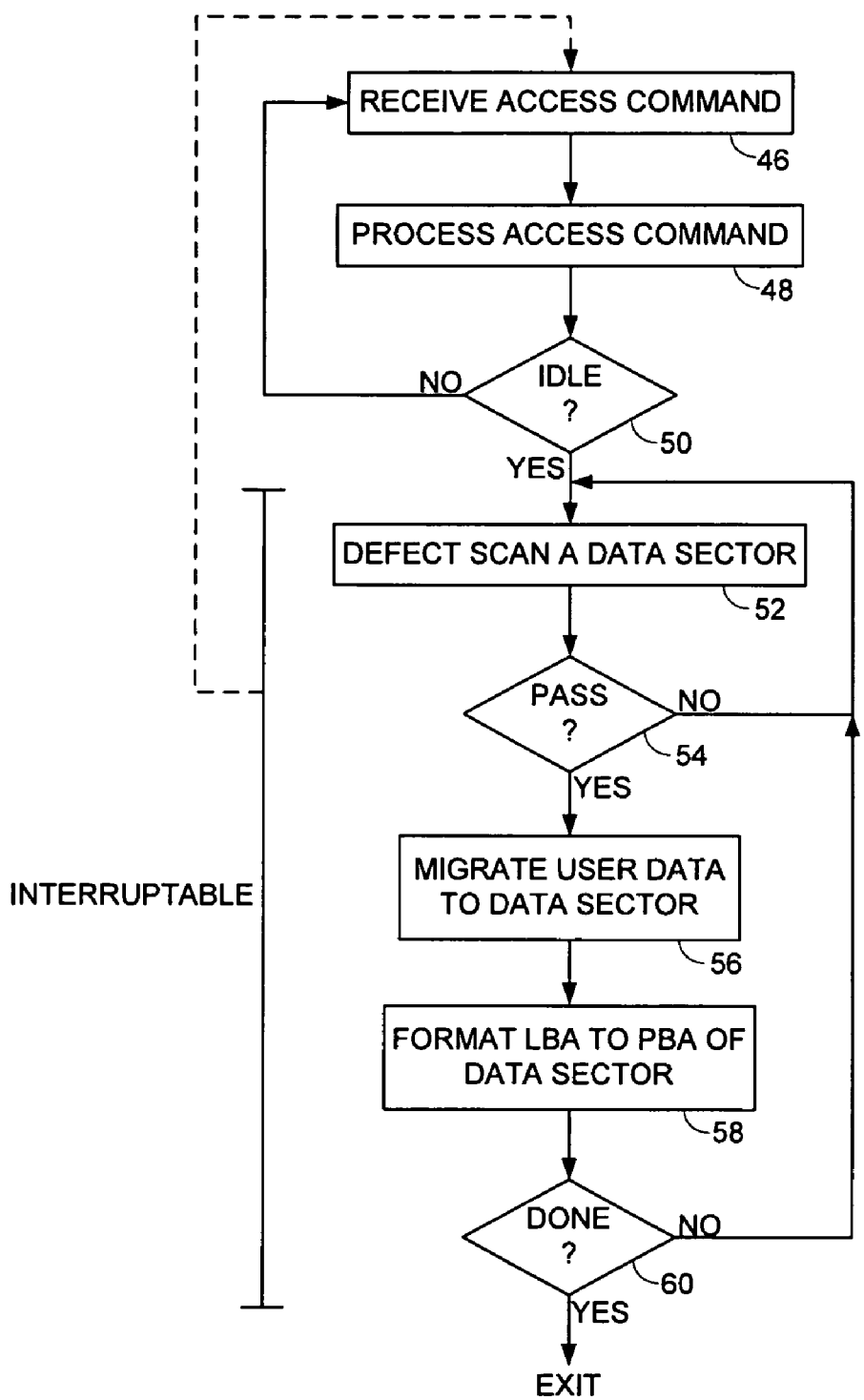
FIG. 4 is a flow diagram according to an embodiment of the present invention wherein unformatted data sectors are defect scanned, filled with migrated user data, and formatted during an idle mode of the disk drive.

FIG. 4 is a flow diagram according to an embodiment of the present invention wherein the control circuitry 6 receives access commands from the host (step 46) and processes the access commands (step 48). When the disk drive enters an idle mode (step 50), for example, after a predetermined period of time that an access command has not been received from the host, the control circuitry 6 enters a background task wherein an unformatted data sector is defect scanned (step 52), and when it passes the defect scan (step 54), the user data is migrated from one of the temporary data sectors to the defect scanned data sector (step 56). The LBA corresponding to the user data is then formatted to the defect scanned data sector (step 58) such that when a subsequent access command (read or write) is received from the host that identifies the LBA, the control circuitry 6 access the formatted data sector. This flow diagram is then re-executed starting at step 52 to defect scan, migrate, and format a next data sector. In this manner, at least some of the data sectors can be defect scanned and formatted while the disk drive is in the field, thereby reducing the manufacturing time of each disk drive.

In one embodiment (illustrated in FIG. 4), the background task for defect scanning and formatting of data sectors is interruptable in order to process a new access command received from the host (step 46). In one embodiment, when the disk drive re-enters the idle mode, the background task starts over from step 52. Data is not "lost" even after the migration step (step 56) because the mapping from the temporary data sector does not change until the LBA is formatted (step 58). In another embodiment, the background task is re-started at the step where it was interrupted previously. In either embodiment, the step of formatting the LBA (step 58) is not interruptable to ensure that the formatting process finishes once it begins so that data is not lost, for example, due to a power failure.

Figure 5:
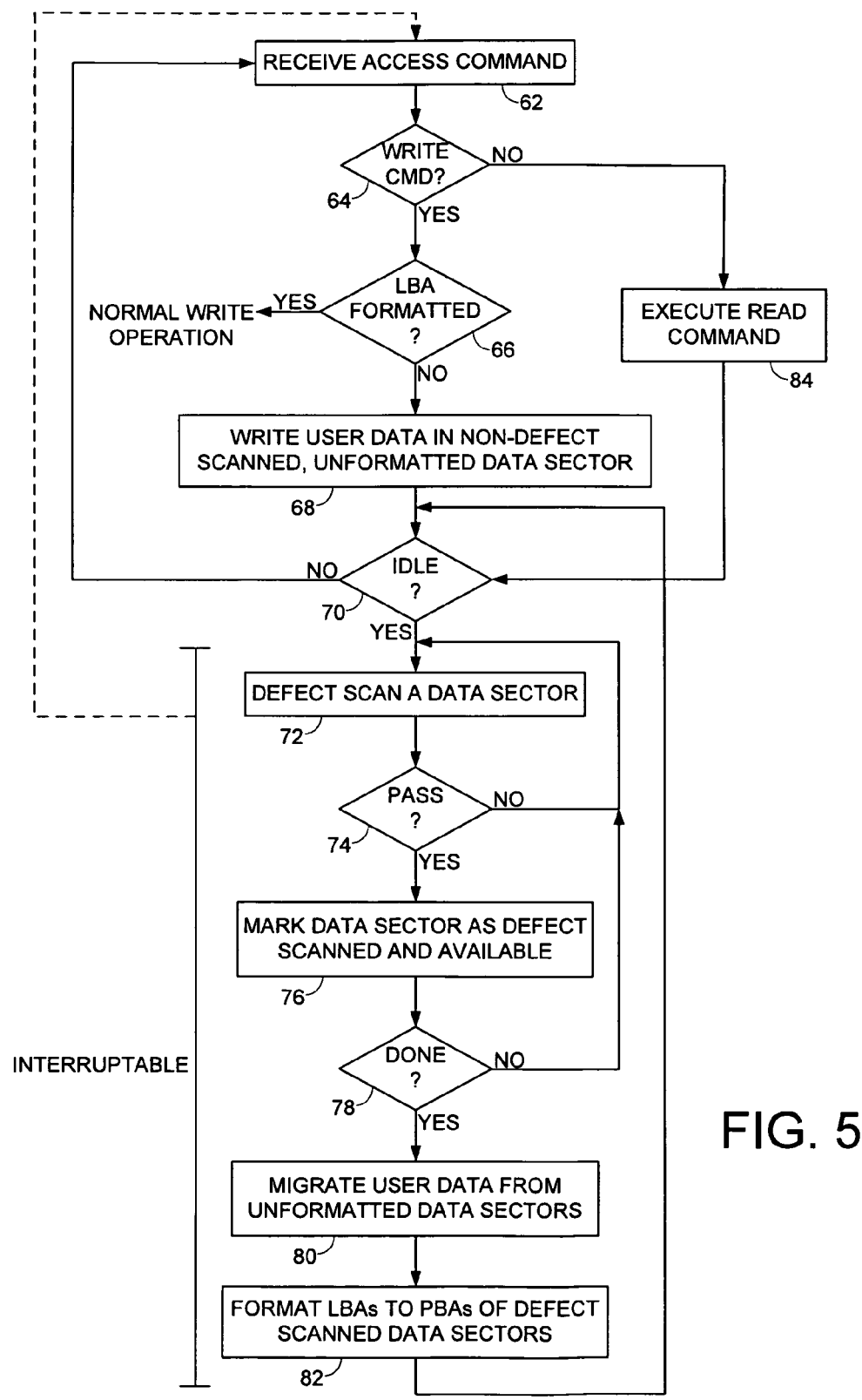
FIG. 5 is a flow diagram according to an embodiment of the present invention wherein multiple data sectors are defect scanned prior to performing the migration and formatting operation.

FIG. 5 is a flow diagram according to an embodiment of the present invention wherein the control circuitry 6 receives an access command from the host (step 62). If the access command is a write command (step 64), and the write command comprises a formatted LBA or LBAs (step 66), then the write command is executed normally by writing to the formatted data sectors. If the write command comprises one or more unformatted LBAs (step 66), then the corresponding user data is written to a non-defect scanned, unformatted data sector (step 68). When the disk drive enters the idle mode (step 70), an unformatted data sector is defect scanned (step 74). If the unformatted data sector passes the defect scan (step 74), then it is marked as defect scanned and available for formatting (step 76). If the unformatted data sector fails the defect scan (step 74) then it is essentially discarded (slipped) so that it is never formatted and never used. This process is repeated for a number of data sectors (step 78), and then user data is migrated from the temporary unformatted data sectors to the defect scanned data sectors (step 80), and the corresponding LBAs are formatted to the defect scanned data sectors (step 82).

Figure 6:
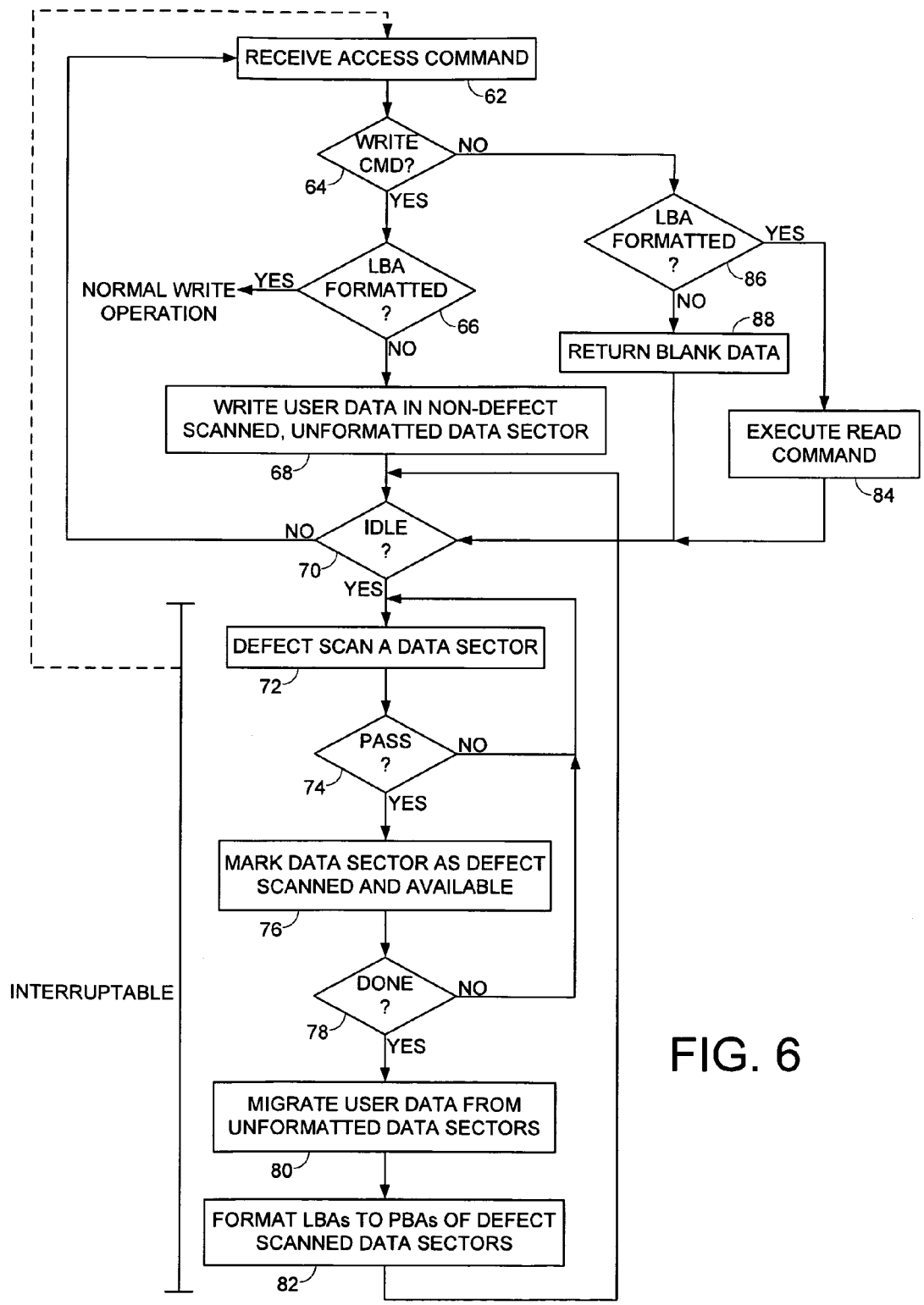
FIG. 6 is a flow diagram according to an embodiment of the present invention wherein if a read command is received to read data from an unformatted data sector, blank data is returned.

In the embodiment of FIG. 5, if an access command received from the host is a read command (step 64), then it is assumed that the LBAs identified in the read command are all formatted, and the read command is executed normally (step 84). In an alternative embodiment shown in the flow diagram of FIG. 6, if an access command received from the host is a read command (step 64), the LBAs are evaluated to verify they are all formatted (step 86). If a data sector identified by the read command is unformatted, then the control circuitry 6 returns blank data to the host (step 88), wherein the blank data may comprise any suitable sequence, such as all zeros.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data sectors, wherein a physical block address (PBA) is associated with each data sector;
   a head actuated radially over the disk; and
   control circuitry operable to:
   receive a write command from a host to write user data to the disk, the write command comprising an unformatted logical block address (LBA);

write the user data to a first data sector;
write verify the first data sector;
defect scan a second data sector;
after the second data sector passes the defect scan, migrate the user data from the first data sector to the second data sector; and
format the LBA to the second data sector.

2. The disk drive as recited in claim 1, wherein the control circuitry is further operable to defect scan data sectors from a first diameter of the disk toward a second diameter of the disk.

3. The disk drive as recited in claim 2, wherein the first data sector is located near the second diameter of the disk.

4. The disk drive as recited in claim 1, wherein, if the write verify fails, the control circuitry is operable to:
write the user data to a third data sector;
write verify the third data sector;
after the second data sector passes the defect scan, migrate the user data from the third data sector to the second data sector; and
format the LBA to the second data sector.

5. The disk drive as recited in claim 1, wherein the control circuitry is operable to defect scan the second data sector during an idle mode of the disk drive.

6. The disk drive as recited in claim 1, wherein when the second data sector fails the defect scan, the control circuitry is further operable to:
defect scan a fourth data sector;
after the fourth data sector passes the defect scan, migrate the user data from the first data sector to the fourth data sector; and
format the LBA to the fourth data sector.

7. The disk drive as recited in claim 1, wherein the control circuitry is further operable to:
receive a read command from a host to read data from the disk, the read command comprising an unformatted LBA; and
return blank data to the host corresponding to the unformatted LBA.

8. A method of operating a disk drive, the disk drive comprising a disk comprising a plurality of data sectors, wherein a physical block address (PBA) is associated with each data sector, and a head actuated radially over the disk, the method comprising:
receiving a write command from a host to write user data to the disk, the write command comprising an unformatted logical block address (LBA);
writing the user data to a first data sector;
write verifying the first data sector;
defect scanning a second data sector;
after the second data sector passes the defect scan, migrating the user data from the first data sector to the second data sector; and
formatting the LBA to the second data sector.

9. The method as recited in claim 8, further comprising defect scanning data sectors from a first diameter of the disk toward a second diameter of the disk.

10. The method as recited in claim 9, wherein the first data sector is located near the second diameter of the disk.

11. The method as recited in claim 8, wherein, if the write verify fails, further comprising:
writing the user data to a third data sector;
write verifying the third data sector;
after the second data sector passes the defect scan, migrating the user data from the third data sector to the second data sector; and
formatting the LBA to the second data sector.

12. The method as recited in claim 8, further comprising defect scanning the second data sector during an idle mode of the disk drive.

13. The method as recited in claim 8, wherein when the second data sector fails the defect scan, further comprising:
defect scanning a fourth data sector;
after the fourth data sector passes the defect scan, migrating the user data from the first data sector to the fourth data sector; and
formatting the LBA to the fourth data sector.

14. The method as recited in claim 8, further comprising:
receiving a read command from a host to read data from the disk, the read command comprising an unformatted LBA; and
returning blank data to the host corresponding to the unformatted LBA.

* * * * *